Sept. 13, 1966    R. N. SCHMIDT    3,272,986
SOLAR HEAT ABSORBERS COMPRISING ALTERNATE LAYERS
OF METAL AND DIELECTRIC MATERIAL
Filed Sept. 27, 1963    3 Sheets-Sheet 1
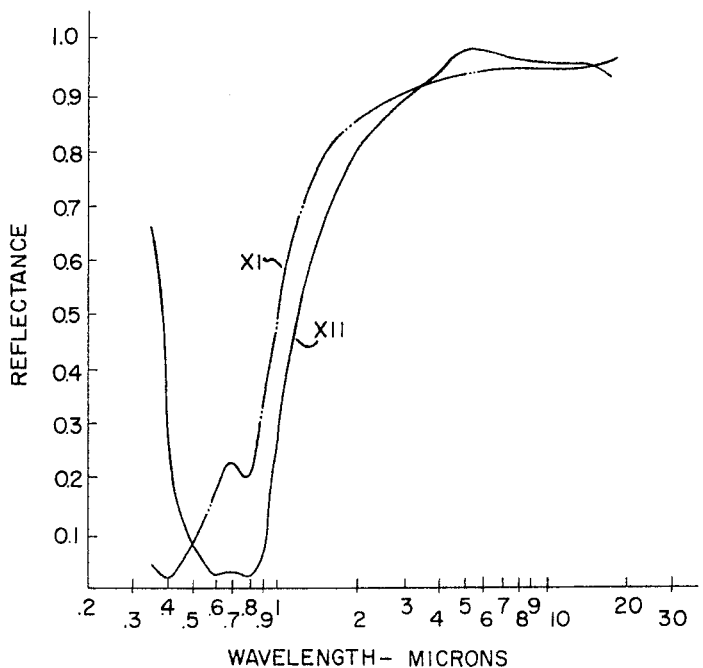
FIG 5
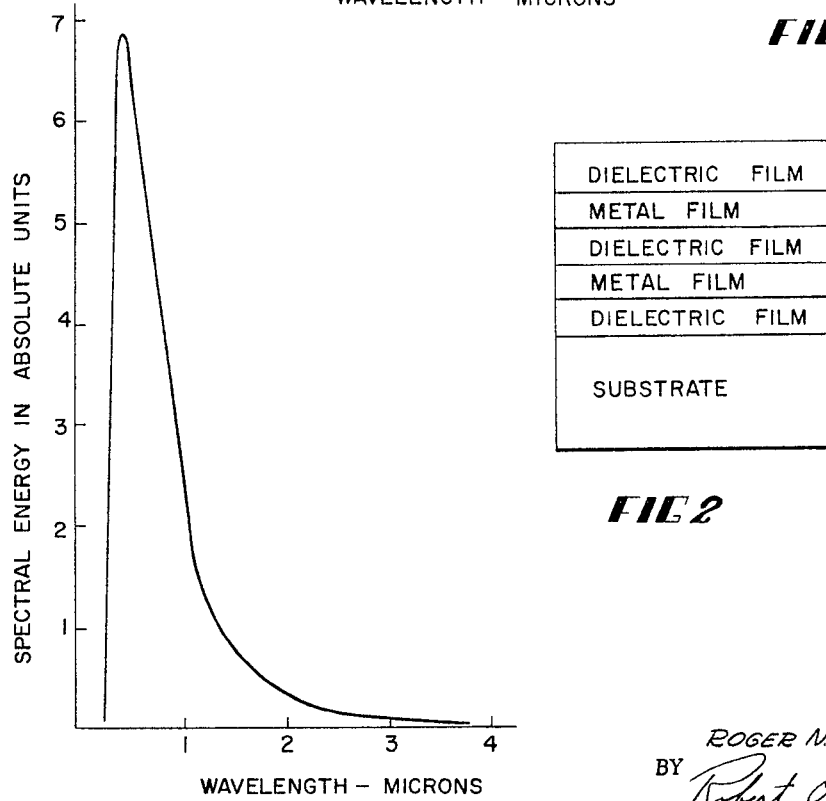
FIG 2
FIG 1
INVENTOR.
ROGER N. SCHMIDT
BY Robert O. Vidas
ATTORNEY INVENTOR.
ROGER N. SCHMIDT
BY Robert O. Vidas
ATTORNEY – # United States Patent Office 3,272,986
Patented Sept. 13, 1966

3,272,986
SOLAR HEAT ABSORBERS COMPRISING ALTERNATE LAYERS OF METAL AND DIELECTRIC MATERIAL
Roger N. Schmidt, Minnetonka, Minn., assignor to Honeywell Inc., a corporation of Delaware
Filed Sept. 27, 1963, Ser. No. 312,034
5 Claims. (Cl. 250—86)

The sun is a convenient source of energy for space vehicles. As the power requirements for space vehicles increase, present systems using solar cells for harnessing solar energy lose their weight advantages and possibly their reliability over systems which absorb the solar energy and convert it to useful power by some type of heat engine or thermoelectric generator. The present invention relates to solar heat absorbers for use in such systems and more particularly to solar heat absorbers adapted for highly efficient operation in a space environment. These absorbers in accordance with the present invention comprise multiple metal and dielectric films prepared in a laminar fashion to provide an interference film system.

The achievement of high efficiency in the absorption of solar energy presents the problem of providing a surface which is black to solar energy but which at the same time has a low emittance or heat loss in the infrared region. It is generally recognized that black surfaces are good absorbers of heat, but they are also strong radiators. In fact, a good radiator is defined as a black body. Thus, it has been universally accepted that while most solar absorbers should be black to absorb energy they also lose heat at a maximum rate. Since the spectral distribution of solar energy is quite different from the spectral distribution of the lower temperature energy emitted by a solar heated surface, the possibility exists of finding surfaces which have high absorptance in the solar spectrum and low emittance in the infrared region.

The present invention provides interference film systems made up of multiple metal and dielectric layers which achieve such a desirable absorptance-emittance relationship. It is well known that multiple quarter-wavelength layers achieve minimum reflectivity or high absorptance for a thin film system over a dielectric substrate. This knowledge prompted the investigation and ultimate discovery that multiple layers of a certain metal and certain dielectrics over an opaque metal substrate will provide a film system exhibiting highly efficient absorption of solar energy with a minimum heat loss while being particularly adapted for use in a space environment.

In addition to high absorption and low emittance, the present invention provides absorbers which are spectrally selective. By properly manipulating the numbers and thickness of the layers forming the film system, maximum absorption can be made to take place over a wide range of wavelengths.

Spectrally selective absorbers give increased collection efficiency with relatively low solar concentration and temperatures greater than 500° F. Low solar concentrations and low absorber temperatures require relatively long cutoff wavelengths. On the other hand, at moderate solar concentrations and relatively high absorber temperatures, absorbers with cutoff wavelengths in the 1 to 2.5 micron region are needed.

An object of this invention is to provide selective solar heat absorbers having a relatively high absorption in the solar spectrum and a relatively low emittance in the infrared region.

Another object of this invention is to provide multiple metal and a dielectric interference film systems in the form of solar absorbers which are capable of achieving high temperatures upon exposure to moderate solar concentration.

Another object is to provide highly efficient solar heat absorbers with cutoff wavelengths in the 1 to 2.5 micron region.

A further object is to provide solar heat absorbers capable of operating efficiently at high temperatures in a range of 1,000° F.

A still further object is to provide solar absorbing surfaces capable of operating upon sustained exposure to a space environment.

Yet another object is to provide durable solar absorbing surfaces exhibiting good adherence and abrasion resistance.

A further object is to provide solar heat absorbers of the interference type which are relatively easy to construct.

It is another object to provide selective solar absorbers which exhibit high absorption of solar energy in the wavelengths where the solar energy is particularly concentrated (0.2–1 micron) and which have low infrared emittance at wavelengths above about 2.5 microns.

These and other objects will become apparent from consideration of the following specification and claims taken together with the accompanying drawings, in which:

FIGURE 1 is a graph showing the energy density distribution of the solar spectrum;

FIGURE 2 is a schematic drawing of a solar absorber in accordance with the present invention;

FIGURE 5 is a graph showing the spectral reflectance of a series of molybdenum-tantala multiple film systems in accordance with the present invention.

Figure 3A:
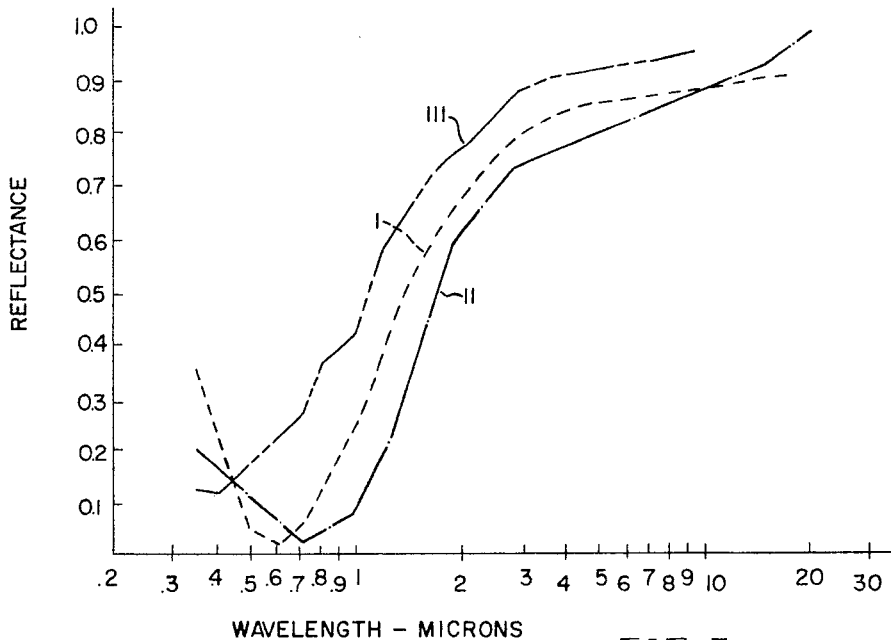
FIGURES 3a and 3b are graphs showing the spectral reflectance of a series of molybdenum-alumina multiple film systems in accordance with the present invention.

As can be seen from a study of FIGURE 1, solar energy is highly concentrated within the wavelength range from about 0.2 to about 1 micron. Therefore, to be an efficient collector a surface must absorb strongly within this range.

As stated above, the method for tailoring the optical properties of a surface contemplated by this invention is the use of thin films placed in a laminar arrangement on a substrate to produce optical interference or reinforcement bands at the desired wavelengths. This interference type of structure, in which a thin metal film is deposited over a reflective substrate, produces absorption bands. Additional layers consisting of partially transmitting metal films and dielectric films are used to broaden the desired absorption band and help achieve cutoff at desired wavelengths. In accordance with the present invention such coatings are designed to have absorption bands in the solar spectrum region but to be transparent in the infrared region. In this manner, a laminar arrangement is formed which has high solar absorption and low radiative heat loss in the infrared region. An example of the laminar structure of an interference film system in accordance with the present invention is shown schematically in FIGURE 2.

In addition to the desired absorptance and emittance properties, these coatings are intended to be used at elevated temperatures in space (1,000° F.), therefore they must possess very low vapor pressure and must be chemically compatible so that the films do not diffuse into or react with one another.

For solar absorbers of the type described herein, the primary criteria for material selection have been found to be following:

(A) *Substrate.*—High reflectance in the infrared, high melting temperature, low vapor pressure and low electrochemical potential (to provide chemical stability with the dielectric layer).

(B) *Dielectric film.*—High transmittance in the infrared, high melting temperature, low vapor pressure and high electrochemical potential.

(C) *Metal film.*—High reflectance in the infrared, high melting temperature, low vapor pressure and low electrochemical potential.

Secondly, but nevertheless important criteria for both the metal and dielectric films are adhesion, abrasion resistance, ease of preparation, and in some cases high selective absorption in the solar spectrum.

For the purposes of this invention, the materials which proved to be most effective and satisfactory in combination are the following:

(A) *Substrate.*—Opaque molybdenum.

(B) *Dielectric film.*—Alumina ($Al_2O_3$), magnesia (MgO), and tantala ($Ta_2O_5$).

(C) *Metal film.*—Thin layers of molybdenum.

The dielectric and metallic thin films utilized herein were produced by evaporation techniques. Although the evaporation processes are somewhat difficult due to the low vapor pressure of the materials, two evaporation methods are currently available and have been successfully utilized for the deposition of the materials utilized herein:

(A) Resistance heated boat technique
(B) Electron beam technique

In order to properly apply theoretical analysis and optimize the properties of the evaporated layers, it was found necessary to reproduce films accurately. Electrical resistance measurements were selected for monitoring the thickness of the molybdenum films since transmittance and absorptance were found to be a linear function of thickness expressed in terms of resistance. Hence, the thickness of the molybdenum thin films is expressed herein in terms of ohms per square unit of area.

Reflectance measurements were selected for monitoring the thickness of the dielectric films since such data is readily converted to absorptance and optical thickness (an expression of thickness in terms of minimum reflectance or maximum absorptance at a particular wavelength range). Hence, the thickness of the dielectric films is expressed herein in terms of $1/4 \lambda$ at a particular wavelength range in microns.

Solar absorptance values were calculated from spectral reflectance measurements made on an integrating hemisphere reflectometer. The measurements were made in a vacuum at about 1000° F. Total emittance was measured on a total hemispherical emittance radiometer.

*Examples*

Figure 3B:
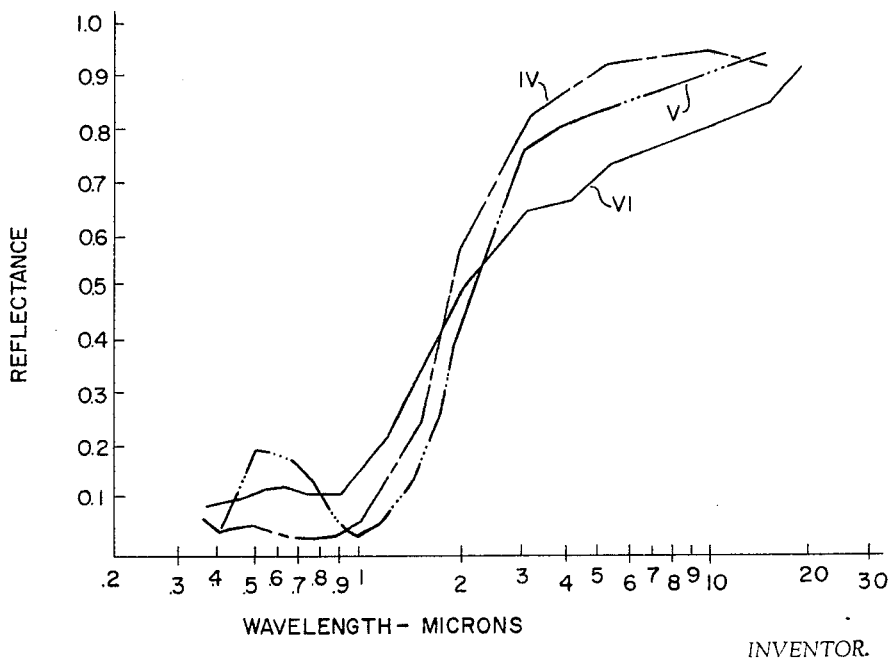

Referring now to FIGURE 3a, the spectral reflectance curves are shown for Examples I, II and III. FIGURE 3b shows similar curves for Example IV, V and VI. Since absorptance is the reciprocal of reflectance, these curves show the absorptance of these systems indirectly. The examples (I through VI) are typical interference film systems in accordance with the present invention in which the dielectric films are composed of evaporated layers of alumina arranged in laminar relationship with thin layers of molybdenum.

| Example I | | Thickness | Solar Absorptance |
|---|---|---|---|
| Metal Film | Mo | 1470Ω/sq. | 0.72 |
| Dielectric Film | $Al_2O_3$ | $1/4 \lambda$ at 0.6μ | Emittance |
| Substrate | Mo | Sheet (opaque) | 0.11 |

| Example II | | Thickness | Solar Absorptance |
|---|---|---|---|
| Dielectric Film | $Al_2O_3$ | $1/4$ at 1μ | 0.83 |
| Metal Film | Mo | 1200Ω/sq. | Emittance |
| Dielectric Film | $Al_2O_3$ | $1/4 \lambda$ at 0.2μ | 0.12 |
| Metal Film | Mo | 2150Ω/sq. | |
| Dielectric Film | $Al_2O_3$ | $1/4 \lambda$ at 0.3μ | |
| Substrate | Mo | Sheet (opaque) | |

| Example III | | Thickness | Solar Absorptance |
|---|---|---|---|
| Metal Film | Mo | 550Ω/sq. | 0.70 |
| Dielectric Film | $Al_2O_3$ | $1/4 \lambda$ at 0.35μ | Emittance |
| Substrate | Mo | Sheet (opaque) | 0.08 |

| Example IV | | Thickness | Solar Absorptance |
|---|---|---|---|
| Dielectric Film | $Al_2O_3$ | $1/4 \lambda$ at 1μ | 0.83 |
| Metal Film | Mo | 1200Ω/sq. | Emittance |
| Dielectric Film | $Al_2O_3$ | $1/4 \lambda$ at 0.3μ | 0.11 |
| Metal Film | Mo | 2150Ω/sq. | |
| Dielectric Film | $Al_2O_3$ | $1/4 \lambda$ at 0.2μ | |
| Substrate | Mo | Sheet (opaque) | |

| Example V | | Thickness | Solar Absorptance |
|---|---|---|---|
| Metal Film | Mo | 600Ω/sq. | 0.82 |
| Dielectric Film | $Al_2O_3$ | $1/4 \lambda$ at 0.6μ | Emittance |
| Metal Film | Mo | 600Ω/sq. | 0.17 |
| Dielectric Film | $Al_2O_3$ | $1/4 \lambda$ at 0.6μ | |
| Substrate | Mo | Sheet (opaque) | |

| Example VI | | Thickness | Solar Absorptance |
|---|---|---|---|
| Dielectric Film | $Al_2O_3$ | $1/4 \lambda$ at 0.3μ | 0.82 |
| Metal Film | Mo | 1500Ω/sq. | Emittance |
| Dielctric Film | $Al_2O_3$ | $1/4 \lambda$ at 0.5μ | 0.12 |
| Metal Film | Mo | 990Ω/sq. | |
| Dielectric Film | $Al_2O_3$ | $1/4 \lambda$ at 0.9μ | |
| Metal Film | Mo | 1500Ω/sq. | |
| Dielectric Film | $Al_2O_3$ | $1/4 \lambda$ at 0.3μ | |
| Substrate | Mo | Sheet (opaque) | |

From a study of these examples, it can readily be seen that alumina and molybdenum layers can be deposited in various thicknesses and numbers to obtain a desired absorptance-emittance and cut-off wavelength relationship.

0.01 inch molybdenum sheet stock has been found to serve as a satisfactory substrate for the metal and substrate layers although the substrate need not be any particular thickness. The only requirement necessary in this regard is that the substrate be opaque to solar radiation and highly reflective to infrared. This can be accomplished by providing a relatively thick molybdenum substrate or by providing a thin substrate with a suitable surface treatment. In either case, the means will be obvious to those skilled in the art.

Examples I through VI have cut-off wavelengths in the 1 to 2.5 micron region and exhibit excellent solar absorptances in the range from 0.72 to 0.83 with emittance as low as 0.08 in one instance. The measurement temperature for these examples was about 1000° F. in a vacuum.

Figure 4A:
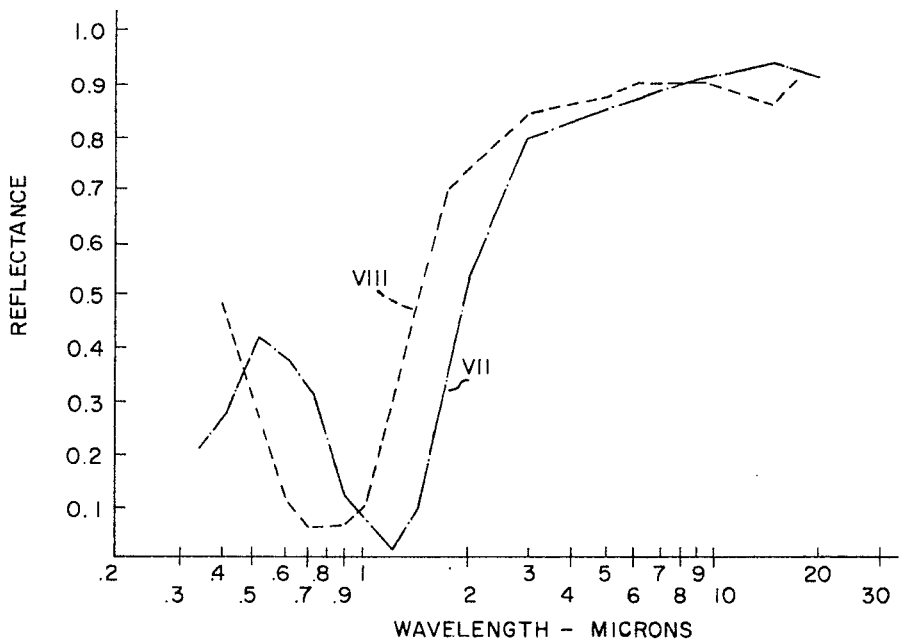
FIGURES 4a and 4b are graphs showing the spectral reflectance of a series of molybdenum-magnesia multiple film systems in accordance with the present invention.
Figure 4B:
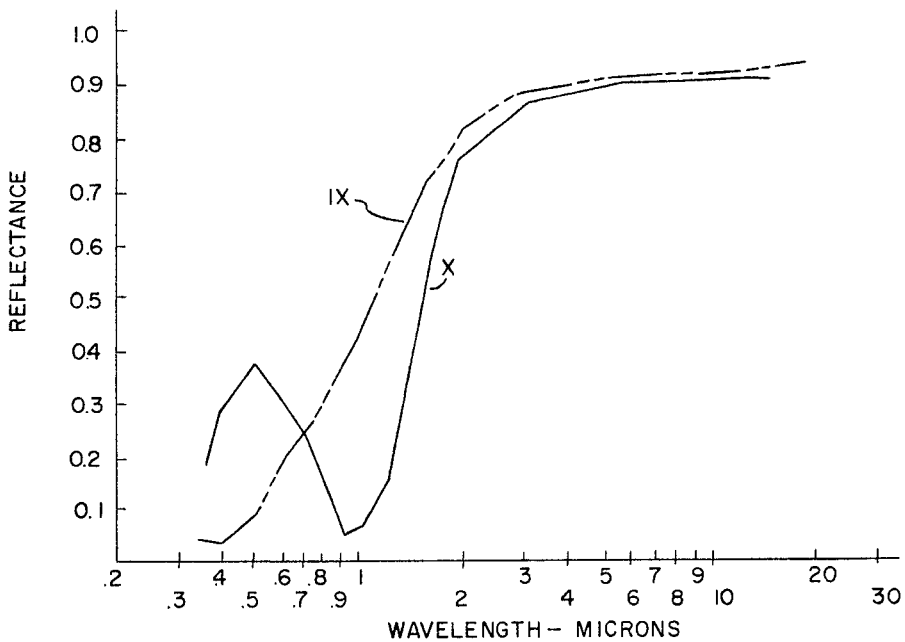

Reference is now made to FIGURES 4a and 4b in which the spectral reflectance curves are shown for Examples VII, VIII, IX and X, respectively. As in FIGURES 3a and 3b, reflectance is shown rather than absorptance which is shown indirectly.

| Example VII | | Thickness | Solar Absorptance |
|---|---|---|---|
| Metal Film | Mo | 1800Ω/sq. | 0.72 |
| Dielectric Film | MgO | ¼λ at 0.5μ | Emittance |
| Substrate | Mo | Sheet (opaque) | 0.07 |

| Example VIII | | Thickness | Solar Absorptance |
|---|---|---|---|
| Metal Film | Mo | 1500Ω/sq. | 0.72 |
| Dielectric Film | MgO | ¼λ at 0.35μ | Emittance |
| Metal Film | Mo | 1500Ω/sq. | 0.17 |
| Dielectric Film | MgO | ¼λ at 0.5μ | |
| Substrate | Mo | Sheet (opaque) | |

| Example IX | | Thickness | Solar Absorptance |
|---|---|---|---|
| Metal Film | Mo | 1825Ω/sq. | 0.68 |
| Dielectric Film | MgO | ¼λ at 0.4μ | Emittance |
| Substrate | Mo | Sheet (opaque) | 0.10 |

| Example X | | Thickness | Solar Absorptance |
|---|---|---|---|
| Dielectric Film | MgO | ¼λ at 0.35μ | 0.67 |
| Metal Film | Mo | 1500Ω/sq. | Emittance |
| Dielectric Film | MgO | ¼λ at 0.5μ | 0.12 |
| Substrate | Mo | Sheet (opaque) | |

These examples (VII through X) are representative of a second embodiment of the invention in which the film system consists of dielectric layers of magnesia arranged in laminar relationships with thin layers of molybdenum. These thin layers are supported on the opaque molybdenum substrate to form an interference film system similar to the examples discussed above and as schematically shown in FIGURE 2. Again, the number of laminar layers can be varied to obtain desired absorptance and emittance properties as stated hereinabove in conjunction with Examples I through VI.

A comparison of the spectral reflectance curves and data shown in these examples will show that analogous results are obtained when either alumina or magnesia are used as the dielectric layers for the solar absorber.

Examples VII through X have cut-off wavelengths in the 1 to 2.5 micron region and exhibit useful solar absorptances in the range from 0.68 to 0.72 with emittance as low as 0.07. These measurements were made at about 1000° F. in a vacuum.

Referring now to FIGURE 5, the spectral reflectance curves are shown for a third set of examples of the invention in which the dielectric layers are tantala. These examples (XI and XII) disclose in detail laminar arrangement utilized to obtain the curves of FIGURE 5. Molybdenum is again utilized as the thin metal film and the opaque substrate as in the other embodiments of the invention.

| Example XI | | Thickness | Solar Absorptance |
|---|---|---|---|
| Metal Film | Mo | 1500Ω/sq. | 0.76 |
| Dielectric Film | Ta$_2$O$_5$ | ¼λ at 0.6μ | Emittance |
| Substrate | Mo | Sheet (opaque) | 0.07 |

| Example XII | | Thickness | Solar Absorptance |
|---|---|---|---|
| Metal Film | Mo | 1400Ω/sq. | 0.69 |
| Dielectric Film | Ta$_2$O$_5$ | ¼λ at 0.4μ | Emittance |
| Substrate | Mo | Sheet (opaque) | 0.08 |

A study of Examples XI and XII show that the absorptance and emittance properties thereof are analogous to those exhibited by the film systems utilizing alumina and magnesia. That is, the properties can be varied according to the number and thickness of the thin layers placed on the substrate and further, substantially identical properties can be obtained with any of the dielectric materials selected to form a solar absorber.

The tantala examples exhibit cut-off wavelengths from slightly below 1 to about 2.5 microns and solar absorptances of 0.76 and 0.69 with emittances of 0.07 and 0.08. These measurements were made at about 1000° F. in a vacuum.

Having described the invention, what is claimed is:

1. A solar heat absorber comprising a substrate and interference film system arranged in laminar relationship to provide a surface adapted to be exposed to solar radiation; said substrate being of a metallic material which is opaque to solar radiation and highly reflective to infrared radiation; said film system comprising a plurality of relatively thin dielectric layers and molybdenum layers alternately arranged on said substrate, said film system having high absorptance in the solar spectral region from about 0.2 to about 1 micron, having a cut-off between 1–2.5 microns and having low emittance above 2.5 microns, said dielectric layers being selected from the group consisting of alumina, magnesia and tantala.

2. A solar heat absorber of the interference film type exhibiting high absorption in the solar spectral region from about 0.2 to about 1 micron and low emittance in the infrared region above about 2.5 microns, said absorber having a cut-off wavelength in the 1–2.5 microns region and comprising: an opaque metallic substrate; and at least one dielectric film and molybdenum film respectively placed thereon in laminar relationship to provide a surface adapted to be exposed to solar radiation, said dielectric film being selected from the group consisting of alumina, magnesia and tantala, and ranging from about ¼λ at 0.2 micron to about ¼λ at 0.5 micron in optical thickness, said molybdenum film ranging from about 500 ohms/square to about 2000 ohms/square in resistivity.

3. A solar heat absorber of the interference film type exhibiting high absorption in the solar spectral region from about 0.2 to about 1 micron and low emissivity in the infrared region above about 2.5 microns, said absorber having a cut-off wavelength in the 1–2.5 microns region and comprising: an opaque molybdenum substrate; and at least one dielectric film and molybdenum film respectively placed thereon in laminar relationship to provide a surface adapted to be exposed to solar radiation, said dielectric film being selected from the group consisting of alumina, magnesia and tantala, and ranging from about ¼λ at 0.2 micron to about ¼λ at 0.5 micron in optical thickness, said molybdenum film ranging from about 500 ohms/square to about 2000 ohms/square in resistivity.

4. A solar heat absorber exhibiting high absorption in the solar spectral region and low emissivity in the infrared region comprising: an opaque molybdenum substrate; and at least one dielectric film and molybdenum film respectively placed thereon in laminar relationship to provide a surface adapted to be exposed to solar radiation, said dielectric ranging from about $\frac{1}{4}\lambda$ at 0.2 micron to about $\frac{1}{4}\lambda$ at 0.5 micron in optical thickness, said molybdenum film ranging from about 500 ohms/square to about 2000 ohms/square in resistivity.

5. A solar heat absorber comprising a substrate and interference film system arranged in laminar relationship to provide a surface adapted to be exposed to solar radiation; said substrate being opaque to solar radiation and reflective to infrared radiation; said film system comprising a plurality of dielectric layers and molybdenum layers alternately arranged on said substrate, said dielectric layers having an optical thickness ranging from about $\frac{1}{4}\lambda$ at 0.2 micron to about $\frac{1}{4}\lambda$ at 0.5 micron and said molybdenum layers ranging from about 500 ohms/square to about 2000 ohms/square in resistivity.

References Cited by the Examiner

UNITED STATES PATENTS

| | | | |
|---|---|---|---|
| 2,519,722 | 8/1950 | Turner | 88—105 |
| 2,585,128 | 2/1952 | Howe et al. | 88—105 |
| 2,903,592 | 9/1959 | Bolay | 250—86 X |

RALPH G. NILSON, *Primary Examiner.*

ARCHIE R. BORCHELT, *Assistant Examiner.*